United States Patent [19]

Meyer et al.

[11] 4,113,009

[45] Sep. 12, 1978

[54] HEAT EXCHANGER CORE FOR RECUPERATOR

[75] Inventors: Robert W. Meyer, Novi; George A. Hall, III, Westland, both of Mich.

[73] Assignee: Holcroft & Company, Livonia, Mich.

[21] Appl. No.: 771,458

[22] Filed: Feb. 24, 1977

[51] Int. Cl.² .......................................... F28F 13/06
[52] U.S. Cl. .................................. 165/154; 165/179; 138/38; 110/326
[58] Field of Search ............. 165/154, 179; 110/97 D; 138/38; 122/44 A, 155 A

[56] References Cited

U.S. PATENT DOCUMENTS

| | | | |
|---|---|---|---|
| 662,964 | 12/1900 | Reis | 138/38 |
| 1,784,652 | 12/1930 | Badger | 122/155 A X |
| 2,034,822 | 3/1936 | Morrow | 138/38 |
| 2,541,175 | 2/1951 | Osterheld | 122/155 A X |
| 3,238,902 | 3/1966 | Escher | 110/97 D X |
| 3,886,976 | 6/1975 | Kardas et al. | 138/38 |

FOREIGN PATENT DOCUMENTS 24,309  12/1912  Norway ..................................... 138/38

*Primary Examiner*—Albert W. Davis, Jr.
*Attorney, Agent, or Firm*—Whittemore, Hulbert & Belknap

[57] ABSTRACT

The invention relates to a recuperator having an improved core within the primary heat transfer surface. This core, by its unique construction, achieves a combination of reradiative and convective heat transfer which outperforms either of these separate modes while maintaining a low pressure loss. The core consists of a series of radial plates between which are a series of triangular baffles arranged at an angle with the horizontal of 45° to 70°. The baffles intercept the flow of flue gas and gently channel the flow of gas into a swirling pattern, thereby enhancing convective heat transfer while maintaining low pressure loss. The staggered triangular baffles also tend to reflect radiation that would otherwise be lost back to the primary heat transfer surface.

10 Claims, 4 Drawing Figures

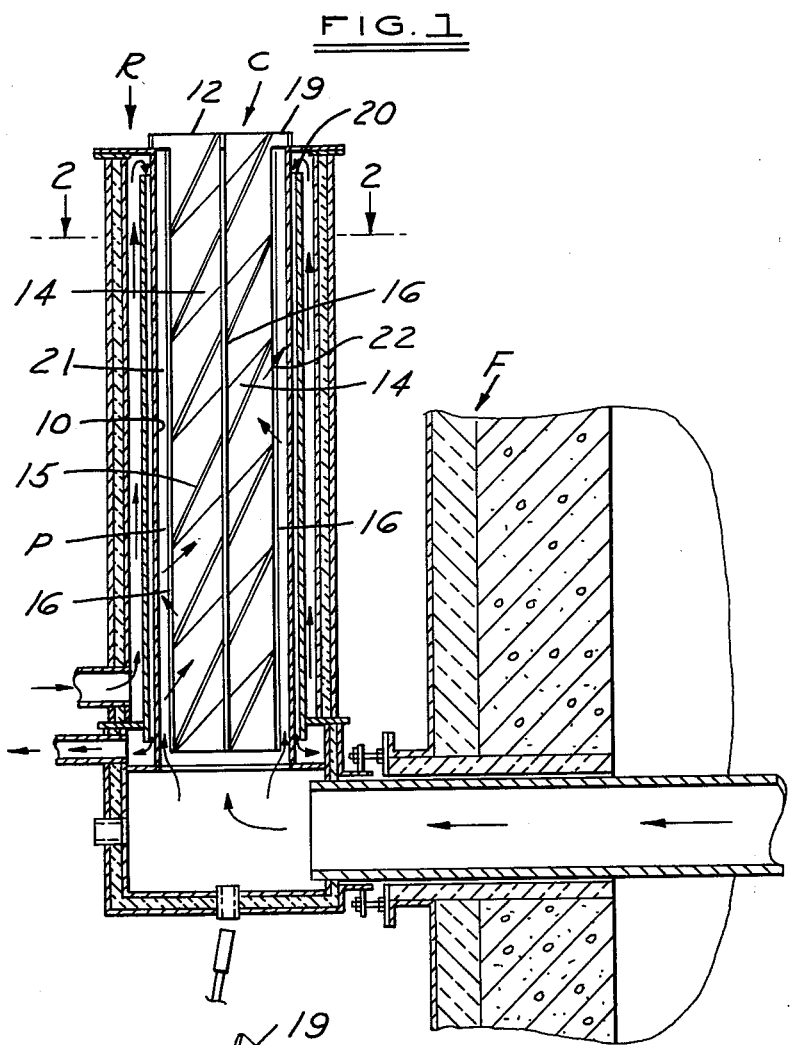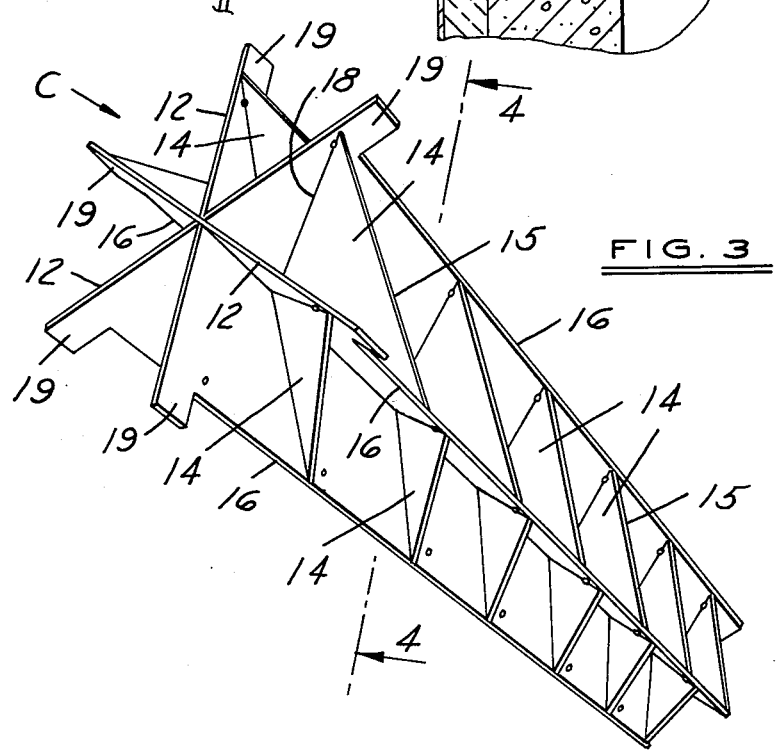

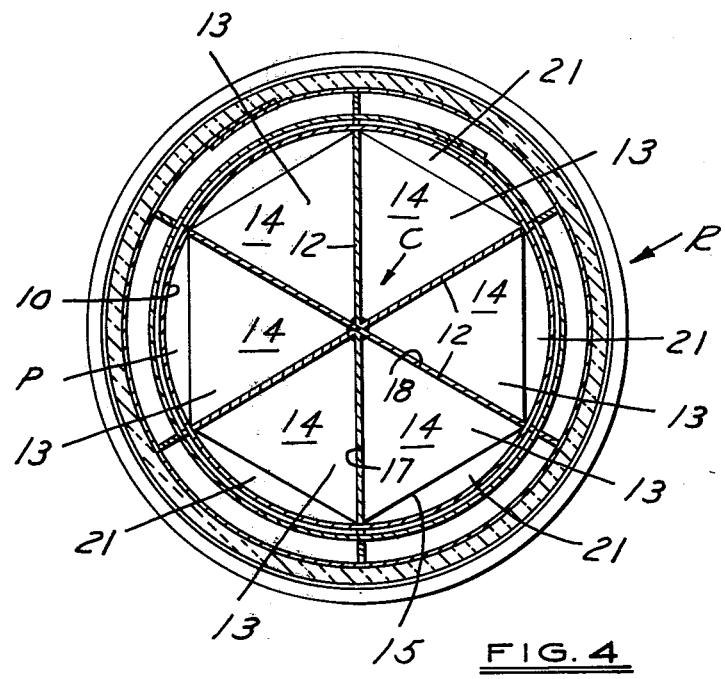
FIG. 2
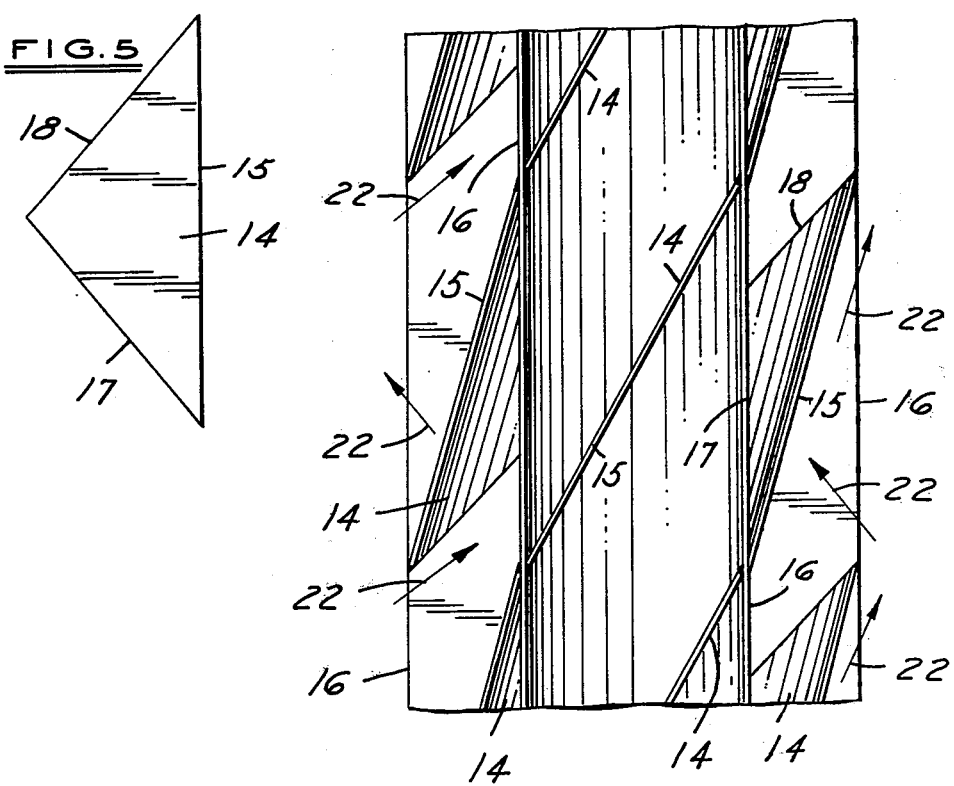
FIG. 5
FIG. 4

HEAT EXCHANGER CORE FOR RECUPERATOR

BACKGROUND OF THE INVENTION

1. Field of the Invention

The invention is in the broad field of heat exchangers primarily in industrial heating where conservation of fuel has made it increasingly important to improve the overall efficiency of extracting energy from the stack gases resulting from combustion. The industrial apparatus for this energy extraction is known as a recuperator.

2. Description of the Prior Art

A common form of prior art recuperator is a multi-walled cylinder with the flue gas passing upwardly through a central cylinder and combustion air passing through two or more of the surrounding annular passageways. The cylinder wall separating the flue gas and combustion air is the primary heat transfer surface. With a double pass on the air side of the heat exchanger, the outer air passage, although counter current to the inner air passage, serves primarily to utilize the incoming air as insulation to the primary heat transfer occurring in the inner air passage. The inner air passage relies on counterflow convective heat transfer from the primary heat transfer surface to the combustion air. Where the flue gas cylinder is unobstructed throughout its length, it can be described as having no core. A core describes a device inserted in the flue gas passage of a recuperator for the purpose of enhancing heat transfer. With no core, heat transfer is accomplished primarily by radiation from the hot gases and convection due to the flow of gas past the outer wall surrounding the flue gas passage. Radiation from the flue gas is a function of the gas composition, the dimensions of the flue column and the temperature of the flue gas. Heat transfer by convection is a function of the velocity of flue gas relative to the heat transfer surface.

An example of a primarily convective core is U.S. Pat. No. 3,859,040, Jan. 7, 1975, invented by Shefsiek and Cone and assigned to the assignee of the present invention. An example of a reradiating core is U.S. Pat. No. 3,886,976, June 3, 1975, invented by Kardas et al. and assigned to Institute of Gas Technology. Other prior art patents revealed in a novelty search are:

U.S. Pat. Nos.: 1,128,146 Jacobs; 1,172,144 Keairnes; 1,858,665 Gibson; 2,356,530 Pflock; 2,462,838 Brierly; 2,726,681 Gaddis et al.; 2,733,908 Graham; 2,910,276 Escher; 3,518,908 Singh; 3,595,299 Weishaupt et al., and 3,886,976 Kardas.

SUMMARY OF THE INVENTION

The invention is the fruit of a combination of mathematically and experimentally or empirically justified considerations and the structure attained is an improvement on the Shefsiek et al. and Kardas et al. patents, previously referred to. The heat exchanger core of the invention is designed to optimize heat transfer by convection within the constraint of low pressure drop. The effect of the core is to induce a swirling motion to the heat transfer media, which swirling motion is accomplished in wide channels with minimal pressure loss. The core of this invention achieves a combination of reradiative and convective heat transfer which outperforms either of these modes used separately and still maintains a low pressure loss. Regardless of which effect, convection or reradiation, is dominant in the heat exchanger using the core of this invention, the structure as hereinafter more fully described is a non-obvious improvement over the prior art.

BRIEF DESCRIPTION OF THE DRAWINGS

FIG. 1 is a sectional elevation showing diagrammatically the core of this invention as a replacement for the core of U.S. Pat. No. 3,859,040.
FIG. 2 is a transverse section on line 2—2 of FIG. 1.
FIG. 3 is a side view of the core in perspective.
FIG. 4 is a transverse section on line 4—4 of FIG. 3.
FIG. 5 is a plan view of a baffle plate before assembly.

DESCRIPTION OF A PREFERRED EMBODIMENT 10 represents the cylindrical wall surrounding the flue gas passage P and constitutes the primary heat transfer surface from the hot flue gas to the gaseous medium to be heated. The improved core C of this invention fits within the cylindrical wall 10 and consists of a plurality of radially extending leaves 12 welded together to form an integrated structure. The outer edges 16 of the radiating leaves are in close proximity to the cylinder wall 10. These leaves 12, which themselves function as a reradiating core, subdivide the cylindrical passage P into a plurality of flue passages 13 of generally triangular cross section bounded by the wall surfaces of the leaves 12 and an outer segment of the surrounding wall 10.

In order to enhance the heat transfer by convection, each of the triangular passages 13 is intercepted by a series of angularly directed triangular baffle plates 14. Each baffle has an outer straight edge 15 extending between the two outer edges 16 of the adjacent radiating leaves 12. The other two edges 17 and 18 of the triangular baffle abut the sides of the radial leaves and extend inwardly to the center of the structure.

When the core 11 of this invention is installed within a vertically placed cylindrical wall 10, it can be secured thereto by tabs 19 which engage upper edge 20 of cylinder 10, permitting the core to be held in place by gravity. The segmental spaces 21 between cylinder wall 10 and outer edges 15 of the baffles form a circumferential series of uninterrupted flue gas passageways extending upwardly through the recuperator. Because of the baffles radially inward of these segmental spaces 21, the flue gas passing upwardly is given a swirling motion as indicated by arrows 22 in FIGS. 1 and 4.

The invention is not limited to particular sizes or numbers of baffles, or angular inclination of the baffles, but the following specific examples are illustrative.

EXAMPLE 1

The new core of the invention consists of six leaves 12 making the angle between them 60°. The inside diameter of cylinder 10 is 9 inches and the length is 4 feet. There are six evenly spaced levels of baffles 14 and with six baffles to each level, this gives a total of 36 baffle plates. Each leaf 12 is of 28-gauge plate 4-15/16 inches wide by 4 feet long, welded along its length to form a star-shaped structure with 60° between each plate. Plates are made of alloy material to withstand temperatures of hot flue gas. The outer diameter of assembled leaf plates is held within 8-3/4 inches.

Each baffle 14 is cut from sheet metal to form a triangle as shown in FIG. 5. The base 15 of the triangle is 5-3/8 inches, while the other sides 17 and 18 are each 3-9/16 inches. The triangles are welded equally spaced along the length of the plates, the long side being opposite the angle formed by the junction of the plates. All triangles in a section are parallel.

When the baffles are installed, the angle of inclination with the horizontal is 60°. When this core was tested in a 9 inch recuperator and compared with prior art cores, preheat achieved was significantly higher for comparable flue gas exhaust temperatures. At 1800° F. the core of the example achieved a preheat of approximately 850° F., whereas a standard reradiating core achieved only 760° F. This 90° F. higher preheat represents an improvement of 10.7% in fuel savings with only a slight increase in pressurization of the gas-fired radiant tube over that obtained with a standard core.

EXAMPLE 2

Following the same principles as shown in Example 1, a core was made and tested in a recuperator having a 24 inch diameter with approximately the same improvement in fuel savings as set forth in Example 1 for a 9 inch diameter recuperator.

The new core of this invention has also been made and tested for 6 inch and 14 inch recuperators.

EXAMPLE 3

In order to understand the use of the improved core C of the present invention as so far described, FIG. 1 has shown in outline form a recuperator connected to a metallurgical furnace heated by a gas-fired radiant tube. FIG. 1 shows a recuperator R and a gas-fired radiant tube type furnace F similar to that described and illustrated in U.S. Pat. No. 3,859,040. The disclosure in said patent is incorporated herein by reference thereto. Instead of the ceramic core 62 of square cross section as shown in FIGS. 3, 4 and 5 of said U.S. Pat. No. 3,859,040, the present invention uses the improved core C described herein.

The invention as hereberfore described is shown in connection with specific examples which have been built and tested. However, the invention is susceptible of various modifications. For example, instead of dividing the core length into six evenly spaced levels with a total of 36 baffle plates as set forth in Example 1, the core length may be divided into five to nine portions. Also, the angular arrangement of baffles, instead of being 60°, may be varied between 45° and 70° with the horizontal.

OPERATION OF THE INVENTION

The new core of this invention causes heat transfer by both convection and reradiation. In the prior art, heat transfer by convection has been accomplished primarily by increasing flow turbulence, but as a consequence there has always been a substantial pressure loss. Typically, any significant improvement in convective heat transfer has always been associated with high pressure losses. In the new core, the deflecting baffles are so arranged as to gently channel the flow of hot media into a swirling pattern, thereby enhancing convective heat transfer with a low pressure loss.

Reradiation is a function of reradiating surface area and a configuration parameter known as shape factor. The baffles in the new core added to the multiple leaf reradiator increase both surface area and shape factor. A reradiating core as described in the Institute of Gas Technology U.S. Pat. No. 3,886,976 accepts heat by radiation and convection from the hot media and reradiates energy to the heat transfer surface separating the hot and cold media. However, all the energy radiating from the core does not strike the heat transfer surface. Some radiation from the core, and the hot gas, is lost by radiation, directly or reflected, traveling out of the heat exchanger.

The baffles of the present invention inserted into the leaves of the reradiator tend to reflect radiation that would otherwise be lost to surroundings back to the heat transfer surface. This results in an increased shape factor and is capable of being shown through accepted mathematical representation.

The heat exchanger core of the present invention is comprised of a vertical six-leaf base configuration to which are attached baffle plates so as to divide the core length into five to nine portions. These baffles are arranged so that baffles in adjacent leaf sections have staggered intercepts with the leaves. The baffles are oriented at an angle to the axis of the leaf configuration. This angle is variable from 45° to 70° with the horizontal, or transverse to the leaf axis.

This configuration is inserted along the longitudinal axis of a circular heat exchanger and interior to the primary heat transfer surface. The core provides heat transfer enhancement from the hot media, flowing interior to the circular heat transfer surface and around the core in a circular motion, to the heat transfer surface and hence the cold media.

The core allows pressure loss on the hot media side of a heat exchanger to be kept at a low value. For the use of combustion products as the hot media, pressurization of the combustion volume is held to a low value to prevent significant effluence of combustion products through openings normally at a slight positive or negative pressure.

From the above it will be seen that the improved core of this invention gives improved results both from convection and reradiation.

What is claimed is:

1. A recuperator comprising a cylinder for flue gases constituting a primary heat transfer surface, a core within said cylinder having a plurality of radial leaves extending outwardly to said cylinder thereby subdividing the same into a plurality of separate flue gas passageways each of which in cross section is bounded by two straight sides and an arcuate side, said radial leaves after receiving heat from said flue gases serving to reradiate said heat to said primary heat transfer surface, and a series of longitudinally spaced triangular baffles in each of said passageways, each baffle secured to the adjacent leaves, inclined to the horizontal, said baffles serving to interrupt said passageways and cause said flue gas to have a gentle swirling motion into and out of the spaces between the outer edges of said baffles and said cylinder, thereby enhancing the convective heat transfer between said flue gas and said primary heat transfer surface.

2. A recuperator according to claim 1 in which each of the longitudinally spaced triangular baffles in at least one of said triangular flue gas passageways has its outer edge spaced from the arcuate surface of said cylinder wall to form a continuous longitudinal channel uninterrupted by said baffles adjacent said cylinder into which the flue gas deflected by said baffles is directed, creating said swirling motion.

3. A recuperator according to claim 2 in which the angle of inclination of said baffles is about 60°.

4. A recuperator according to claim 3 in which the diameter of said cylinder is about 9 inches, the number of radial leaves is six, the length of the cylinder is about 4 feet and the number of longitudinally spaced baffles in each triangular passageway is eight.

5. A recuperator according to claim 1 in which the angle of inclination of said baffles is between 45° and 70°.

6. A recuperator according to claim 1 for use in preheating air supplied to the burner of a fuel fired furnace emitting stack gas at a temperature of 1800° F. or more comprising a vertical cylinder for receiving said stack gas having a diameter from 6 inches to 5 feet and a height from 4 feet to 100 feet, said cylinder constituting a primary heat transfer surface, at least two surrounding cylinders forming between the same passageways for the combustion air, said core forms a reradiator within said cylinder the inclination of each baffle to the horizontal being at an angle between 45° and 70°.

7. A recuperator according to claim 6 in which each of the longitudinally spaced baffles is triangular with two sides secured to adjacent leaves and the third side extending as a cord across the arcuate surface of said cylinder.

8. A recuperator according to claim 7 in which the angle of inclination of said baffles is about 60°, the diameter of the cylinder is about 9 inches and the length of the cylinder is about 4 feet.

9. A recuperator according to claim 8 in which the number of radial leaves in said reradiator is six and the number of longitudinally spaced baffles between each pair of radial leaves is eight.

10. A recuperator according to claim 6 in which the reradiator has six equispaced radial leaves, each of the baffles is triangular with two sides secured to adjacent leaves and the third side extending as a cord across the arcuate surface of said cylinder, said series of baffles serving to interrupt the flue passageways between adjacent leaves leaving continuous uninterrupted longitudinal channels adjacent said cylinder, said baffles causing the flue gas to have a gentle swirling motion from the spaces between said leaves into and out of said channels adjacent the cylinder thereby increasing the convective heat transfer from said flue gas to said primary heat transfer surface, said baffles also assisting said leaves in the reradiation effect.

* * * * *